United States Patent [19]

Burg

[11] Patent Number: 5,611,294

[45] Date of Patent: Mar. 18, 1997

[54] MULTIHULLED AIR CUSHIONED MARINE VEHICLE

[75] Inventor: Donald E. Burg, Miami, Fla.

[73] Assignee: Paulette Renee Burg, Miami, Fla.

[21] Appl. No.: 468,876

[22] Filed: Jun. 6, 1995

Related U.S. Application Data

[63] Continuation-in-part of Ser. No. 737,403, Nov. 1, 1976, abandoned, Ser. No. 818,303, Jul. 25, 1977, Pat. No. 4,165, 703, Ser. No. 69,771, Aug. 27, 1979, abandoned, Ser. No. 207,789, Nov. 17, 1980, abandoned, Ser. No. 269,908, Jun. 3, 1981, Pat. No. 4,392,445, Ser. No. 289,769, Aug. 3, 1981, abandoned, Ser. No. 343,289, Jan. 27, 1982, abandoned, Ser. No. 458,738, Jan. 17, 1983, abandoned, Ser. No. 465,670, Feb. 10, 1983, abandoned, Ser. No. 584,728, Feb. 29, 1984, Pat. No. 4,587,918, Ser. No. 844,529, Mar. 27, 1986, Pat. No. 4,735,164, Ser. No. 862,300, May 12, 1986, Pat. No. 4,739,719, Ser. No. 183,588, Apr. 19, 1988, Pat. No. 4,890, 564, Ser. No. 458,575, Dec. 29, 1989, Pat. No. 5,000,107, Ser. No. 653,724, Feb. 11, 1991, abandoned, Ser. No. 728,887, Jul. 10, 1991, Pat. No. 5,176,095, Ser. No. 871,387, Apr. 21, 1992, abandoned, Ser. No. 151,253, Nov. 12, 1993, Pat. No. 5,415,120, Ser. No. 283,647, Aug. 1, 1994, abandoned, and Ser. No. 347,859, Dec. 1, 1994, abandoned.

[51] Int. Cl.$^6$ .................................................. B63B 1/12
[52] U.S. Cl. ......................... 114/61; 114/67 A; 114/272
[58] Field of Search ............................... 114/61, 67 A, 114/272, 278, 282, 289, 290, 291, 273, 121, 122; 441/41; 440/37

[56] References Cited

U.S. PATENT DOCUMENTS

| | | | |
|---|---|---|---|
| 1,190,944 | 7/1916 | Orlando | 440/37 |
| 2,343,645 | 3/1944 | Dickinson et al. | 244/106 |
| 2,988,035 | 6/1961 | Gram | 114/125 |
| 3,141,436 | 7/1964 | Cathers et al. | 114/67 A |
| 3,191,572 | 6/1965 | Wilson | 114/67 A |
| 3,476,069 | 11/1969 | Mantle et al. | 114/67 A |
| 3,518,956 | 9/1970 | Girodin | 114/67 A |
| 3,799,095 | 3/1974 | Bertin | 114/67 A |
| 3,804,049 | 4/1974 | Greer | 114/67 A |
| 3,968,762 | 7/1976 | Meyer, Jr. | 114/67 A |
| 4,974,539 | 12/1990 | Duffty et al. | 114/282 |
| 5,191,848 | 3/1993 | Hatfield | 114/61 |

FOREIGN PATENT DOCUMENTS 271372  6/1988  European Pat. Off. .............. 114/67 A Primary Examiner—Sherman Basinger
Attorney, Agent, or Firm—Robert J. Van Der Wall

[57] ABSTRACT

An improved multi-hull gas cushion supported marine vehicle that is, in its preferred embodiment, capable of transition to airborne surface effect operation is presented. This marine vehicle, known as SeaCoaster, has optional elongated knife shaped bows that slice into waves, very fine entry and low angle of divergence supporting gas cushions, water rejecting steps that extend high onto the sidehulls, and retractable water stabilizers to insure optimum performance in heavy seas. The retractable water stabilizers are in the form of inverted-T hydrofoils and/or small boat shaped members. Several variations of hydrofoil configurations are presented. It also has special, normally inverted-V shaped, gas cushion and wetdeck aft seals to insure minimum effect of wave impacts in those areas. The gas pressurization system normally includes powered blowers where a flap-like sealing device can be installed to seal gas leakage. This allows a gas pressurizing blower to either maintain cushion gas pressure for minimum draft or evacuate the gas cushion from minimum above water profile. The latter is valuable for patrol boat applications where a minimum radar signature is desired. Connecting ducts between gas cushions can include venturi's that restrict pressure pulses in one gas cushion from traveling to another gas cushion. Retractable or fixed sidewings are optionally proposed to add aerodynamic lift when SeaCoaster is airborne. These sidewings may include outrigger hulls for added stability and improved aerodynamic efficiencies.

45 Claims, 9 Drawing Sheets

MULTIHULLED AIR CUSHIONED MARINE VEHICLE

CROSS REFERENCE TO OTHER APPLICATIONS

This application is a continuation-in-part to applicant's earlier applications, Ser. No. 737,403 filed Nov. 1, 1976, now abandoned; Ser. No. 818,303 filed Jul. 25, 1977, now U.S. Pat. No. 4,165,703 issued Aug. 28, 1979; Ser. No. 069,771 filed Aug. 27, 1979, now abandoned; Ser. No. 207,789 filed Nov. 17, 1980, now abandoned; Ser. No. 269,908 filed Jun. 3, 1981, now U.S. Pat. No. 4,392,445 issued Jul. 12, 1983; Ser. No. 289,769 filed Aug. 3, 1981, now abandoned; Ser. No. 343,289 filed Jan. 27, 1982, now abandoned; Ser. No. 458,738 filed Jan. 17, 1983, now abandoned; Ser. No. 465,670 filed Feb. 10, 1983, now abandoned; Ser. No. 584,728 filed Feb. 29, 1984, now U.S. Pat. No. 4,587,918 issued May 13, 1986; Ser. No. 844,529 filed Mar. 27, 1986, now U.S. Pat. No. 4,735,164 issued Apr. 5, 1988; Ser. No. 862,300 filed May 12, 1986, now U.S. Pat. No. 4,739,719 issued Apr. 26, 1988; Ser. No. 183,588 filed Apr. 19, 1988, now U.S. Pat. No. 4,890,564 issued Jan. 2, 1990; Ser. No. 458,575 filed Dec. 29, 1989, now U.S. Pat. No. 5,000,107 issued Mar. 19, 1991; Ser. No. 653,724 filed Feb. 11, 1991 now abandoned; Ser. No. 728,887 filed Jul. 10, 1991, now U.S. Pat. No. 5,176,095 issued Jan. 5, 1993; Ser. No. 871,387 filed Apr. 21, 1992 now abandoned; Ser. No. 151,253 filed Nov. 12, 1993, now U.S. Pat. 5,415,120 issued May 16, 1995; Ser. No. 283,647 filed Aug. 1, 1994 now abandoned, Ser. No. 347,859 filed Dec. 1, 1994 now abandoned.

FIELD OF THE INVENTION

The instant invention describes marine vehicles that operate in a surface effect condition by entrapping a cushion(s) of artifically pressurized gas between the vehicle and a water surface and/or a ram effect of ambient air that is sandwiched between the vehicle and a water or other surface at higher vehicle speeds. The first are most commonly called hovercraft or Surface Effect Ships (SES's) and the latter Wing in Ground Effect (WIG), Wing in Surface Effect Craft, or simply wingships. The common thread of all of these is that the pressurized gas disposed between the vehicle and the supporting medium carries most of vehicle weight. In any case, overall efficiencies of the SES are much greater than conventional marine vehicles and overall efficiencies of the WIG are much greater than commercial aircraft.

Applicant's earlier developments of marine vehicles using artifically pressurized supporting gas cushions have been successful and have resulted in a number of vehicles being built. What promises to be far superior to any of its predecessors is now called the SeaCoaster marine vehicle that uses multiple hulls with a long and slender air cushion in at least one of such hulls. The multiple hulls have very fine entry bows and controlled divergence of their gas cushions back to a point where the sides of the gas cushions become parallel in the preferred embodiments. Applicant has conducted extensive model tests to establish allowable ranges of divergence of the gas cushions and has also devised an optional new knife type bow that is now referred to as the SeaSaber bow for its wave slicing abilities. The clearly defined low divergence angles of the gas cushions are invaluable for rough sea operation of SeaCoaster. When coupled with the optional SeaSaber bow there are further advantages realized in some speed and sea conditions that makes SeaCoaster an exceptionally good sea boat.

de Pingon, French Patent 0271372 has catamaran-like sidehulls in a marine vehicle with pressurized air cushions under each sidehull; however, the entry of each of his sidehulls is rather blunt and the total divergence of his air cushion sides, as seen in a waterline plane of the hull, is very abrupt with total divergence angles of over 45 degrees. Applicant has established that such divergence angles will contribute to a totally unacceptable ride in rough seas. As a point in fact, applicant limits the total divergence angle of SeaCoaster's gas cushions to less than 22 degrees, with at least part of such divergence preferably on either side of a vertical longitudinal plane of the hull. A divergence angle closer to 15 degrees is optimum while under 18 degrees is set as a good target for good rough sea ride qualities combined with enough divergence to obtain sufficient cushion area to properly support the vehicle. Some discussion is now in order regarding the relevance of the proper divergence angle of the gas cushion from the narrow bow going aft to where the substantially rigid sidekeels bounding a recess in the hull become more parallel. This angle is referred to as the total divergence angle of the sidekeels. First, a rectangular gas cushion with a squared off front end and widely spaced substantially parallel sidehulls that are not joined by a narrow bow forward will actually be the most efficient in calm seas as that squared off bow arrangement has the largest gas cushion area and hence the lowest most efficient gas cushion pressure, the bow seal will actually be clear of the water at high speed resulting in minimum bow seal drag, and the sidekeels will be parallel over their entire length which is a least drag situation. However, such squared off bow seal designs have very poor rough sea performance. Tests have been conducted on Applicant's narrow pointed bow designs with reduced sidekeel total divergence angles. Bow movement or pitching in rough seas starts to fall into an acceptable range at just under 22 degrees total divergence angle. It is a compromise as to how far to lower the total divergence angle and still have sufficient gas cushion area to properly support the vessel. Tests with a sidekeel divergence angle of just under 18 degrees showed a good compromise between rough sea ride qualities and sufficient cushion area. Therefore, the necessary limits of sidekeel divergence angle for the instant invention are less than 22 degrees with less than 18 degrees preferred. Also, SeaCoaster's SeaSaber bow knifes through waves and also gives a longer water-line length which is invaluable for this high speed marine vehicle. In its preferred embodiment, SeaCoaster combines the SeaSaber bow with a very fine entry gas cushion which has total average divergence of less than 18 degrees, a series of vertically high water friction reducing steps down the length of its hulls, and a unique retractable water stabilizer system. Any one of these features, taken individually or collectively, make the instant invention far superior to and widely separate it from de Pingon.

Wilson, U.S. Pat. No. 3,191,572; Gunther U.S. Pat. No. 3,473,503; and Crowley, U.S. Pat. No. 3,742,888 present multiple air cushion hulls. Wilson and Gunther do not have open bottomed recesses in their individual hulls but rather plates with air discharge holes drilled in them as can be seen in FIG. 7 of Gunther and FIG. 2 of Wilson. Further, Gunther does not have air cushion sidekeels on his sidehulls and neither Gunther nor Wilson have recess aft seals in their multiple hulls which is a critical part of the instant invention as such aft seals are required to maintain a pressurized air cushion. Yet another difference is that Wilson's water contacting sidekeels are parallel from their forwardmost portions and do not diverge as specified in the instant invention. Wilson has upwardly curved angled surfaces that become bows forward; however, they, very importantly, do not make water contact in a calm sea surface when the blowers are operating and his boat is traveling forward at high speeds. Crowley, in his closest concept as shown in his FIGS. 9 and 10, does not have individual boat shaped multiple hulls but rather simply multiple air cushions all having a common center bow. As such, neither Wilson, Gunther, nor Crowley have concepts that resemble applicant's instant SeaCoaster invention.

Distinctions are also noted from applicant's U.S. Pat. Nos. 5,176,095 and 5,415,120 that show a total gas cushion divergence angles of over 30 degrees and also from an article in the May 1992 issue of "Ship & Boat International" magazine that shows applicant's earlier concepts where gas cushion divergence angles of approximately 30 degrees are shown. Neither of these divergence angles are acceptable for tolerable seakeeping characteristics. Importantly also, neither applicant's earlier issued patent nor the "Ship & Boat International" article talk of the SeaSaber bow or water stabilizer systems that are preferred components of the instant invention's SeaCoaster hull concepts.

SeaCoaster offers attention to details including the optional use of a venturi positioned in an interconnecting duct that connects gas cushion recesses in separate multiple hulls. The benefit of such a venturi is that is restricts gas pressure pulses from traveling from one multiple hull's gas cushion to another and thereby helps insure a smooth bounce free ride. Freygang, U.S. Pat. No. 2,399,670, uses a venturi as part of an air induction system for inflating a life raft. It is only used when inflating the raft and does not in any way connect two separate gas cushions in a multiple hull air cushion boat. As such, there is little or no resemblance to applicant's instant SeaCoaster invention.

A very serious additional benefit is the use of water stabilizers in the form of a lifting hull(s) or hydrofoil(s) with the SeaCoaster instant inventive hull. The hydrofoils especially reduce pitch of SeaCoasters bows in very rough seas. In their ideal form, these water stabilizers can be retracted up into the gas recesses in the hulls during calm sea or shallow water operation but lowered during operation in heavy seas. Applicant's model tests have shown at least a fifty percent reduction in bow pitch with hydrofoils in use.

Meyer, Jr., U.S. Pat. No. 3,968,762, offers hydrofoils that retract into a single air cushion generic flexible seal SES. He does not offer a multiple hull air cushioned craft as is applicant's instant invention and therefore cannot offer multiple hydrofoils that retract into air cushion recesses. In its most important arrangement, SeaCoaster utilizes retractable hydrofoils widely separated in port and starboard sidehull air cushion recesses. Cathers, et al, U.S. Pat. No. 3,141,436, presents hydrofoils that extend inwardly from outboard sidewalls in a two air cushion craft where such cushions are separated by a narrow skeg and further are each of movable fore and aft seal SES arrangements. Cathers has no way to retract his hydrofoils and does not have boat shaped multiple hulls as does the instant invention so he bears little resemblance to the instant invention. Johnson, U.S. Pat. No. 3,456,611, is a catamaran with hydrofoils but with no gas cushion recesses to withdraw them into so therefore offers little resemblance to the instant invention.

Another important feature of the SeaCoaster instant inventive hull is its use of sidesteps to reduce water friction by keeping water off of the sides of the multiple hulls. This is accomplished by a series of downwardly extending steps that start about midship. Very importantly, the chines of SeaCoaster's sidesteps start highly elevated and swoop down to proximal the level of the chine preceding such sidestep. This is not so of either Pipkorn, U.S. Pat. No. 4,907,520, nor With, U.S. Pat. No. 3,977,347. Pipkorn uses a vertical inset into the side of his hull that remains essentially constant in elevation over its entire after length. With has outwardly extending rearwardly facing steps, noted as 3 in his FIG. 3, and does not have the downwardly swooping chine steps of the instant invention either. As such, neither the patents of Pipkorn nor With have relevance to the instant invention's very efficient sidesteps with downwardly swooping chines.

SeaCoaster lends itself ideally to transformation to an air-borne mode as a WIG as vehicle speed is increased substantially. For example, a wide beam 100 foot SeaCoaster would achieve takeoff speeds to WIG operation at about 110–130 knots. A difficulty of other WIG types is getting up to takeoff speeds efficiently. Various means have been attempted including the Power Augmented Ram Wing (PAR) which simply rams the exhaust of turbojet engines or air propellers under the WIG's wing at lower speeds to obtain sufficient lift. This is an overpowering approach and generally requires extra engines that are not used during high speed cruising WIG operation. SeaCoaster optionally applies outrigger hulls attached to outrigger wings outboard of its air cushioned sidehulls that are beneficial for stability and for added lift. Further, additional winglets can be applied outboard of the outrigger hulls and such would normally include downwardly extending wing caps for improving aerodynamic efficiency.

Bixel, Jr., U.S. Pat. No. 5,105,898 approaches the WIG takeoff problem with a hovercraft or SES that becomes a WIG after takeoff speeds are reached. This is a workable approach as the SES is a very efficient high speed marine vehicle. Bixel's shortcoming has to do with the shortcomings of all SES's related to the movable seals fore and aft between his sidehulls. These movable seals have poor seakeeping abilities, contribute to a pulsing of pressures in the gas cushion that is felt by passengers as severe jolts, and are subject to high maintenance. Also, Bixel, Jr. does not have a water stabilizer system to improve ride qualities and to augment takeoff and/or landing from SES waterborne into the WIG airborne mode or vice versa as does the preferred variant of SeaCoaster.

The instant invention offers advancements over applicant's earlier inventions as well as over the prior art. These advancements are discussed in some detail in the following sections.

SUMMARY OF THE INVENTION

The object of the instant invention is to provide a superior marine vehicle that is, in its majority, supported by pressurized gas.

It is a directly related object of the invention that gas for pressurized gas cushions can be supplied by artificial means.

It is another object of the invention that at least part of the pressurized gas for support of the marine vehicle can be obtained by a gas compression effect that occurs between the vehicle and a supporting surface when the vehicle is traveling forward at high speeds.

An important object of the invention is that multiple hulls are used with pressurized gas supplied to a recess in at least one of such multiple hulls by artificial means such as powered blowers.

It is a related object of the invention that, as seen in a calm sea surface with the gas cushion(s) pressurized and the marine vehicle moving forward at high speed, the sidehulls form either symmetrical or unsymmetrical boat shaped patterns on the water surface with narrow bows that become more parallel going aft.

A related object of the invention is that an aft portion of a pressurized gas recess can be comprised of surfaces angled to horizontal, at least over a portion of its longitudinal lengthened that such aft portion can be called a recess aft seal.

Another object of the invention is that another recess seal can be at least partially positioned in a gas cushion recess forward of the recess aft seal.

Yet another object of the invention is that angled surfaces can be applied to an underside of structure that connects two of the multiple hulls.

It is a related object of the invention that

Another object of the invention is that multiple hulls can include two or more hulls in mechanical communication.

It is a related object of the invention that two or more pressurized gas cushions disposed in separate hulls can be connected through hull interconnecting structure such as ducts.

A directly related object of the invention is that a duct interconnecting pressurized gas cushions in separate hulls can include a venturi to thereby restrict pressure disturbances from traveling between the gas cushions.

It is another object of the invention that movable structure, such as flaps, disposed in blower ducts can be used to seal off gas flow through a blower that may be inoperative.

It is a related object of the invention that a gas pumping device can be used to maintain a multiple hull gas cushion pressurized when the main blowers are inoperative.

It is another related object of the invention that a gas pumping device can be used to evacuate gas from a multiple hull gas cushion when the main blowers are inoperative and thereby lower the profile of the inventive hull.

It is an object of the invention that average total divergence of the sides of the gas cushion be less than 22 degrees for good ride qualities and low resistance.

It is a directly related object of the invention that a further refinement places the total divergence of the sides of the gas cushion at less than 18 degrees for best ride qualities and lowest resistance.

It is a further and optional object of the invention that a forwardly extending saber-like bow be applied to a hull for best rough sea performance.

It is a directly related object of the invention that such a saber-like bow be proximal a calm sea waterline and extend forwardly of its intersection of a lower portion of a normal bow of the vehicle when the gas cushions are pressurized.

It is another related object of the invention that such saber-like bow can contain part of an air cushion recess.

Another object of the invention is that a series of vertically high sidesteps, that preferably extend from proximal a sidekeel to a height that approximates the height of a gas cushion recess, can be recessed into the sides of the multiple hulls where such sidesteps reduce vehicle resistance in both calm and rough seas.

It is a directly related object of the invention that such sidestep's have chines that extend downwardly from their forward position to reform a similar shape prior to following sidestep.

A related object of the invention is to have the last step in the series have a simple recess aft of it to thereby minimize wetted area resistance.

It is yet another object of the invention that a water stabilizing system can be used to improve vehicle ride qualities in rough seas.

It is a related object of the invention that the water stabilizing system can include a hydrofoil.

Another object of the invention is that a water stabilizing hydrofoil structure are, in the main, preferably of an inverted-T shape.

A directly related object of the invention is that the hydrofoils, and their supporting struts, can be airfoil shaped, cleaver or supercavitating shaped, or base vented by gas.

It is a related object of the invention that any water stabilizers applied to the invention can be retracted from the water surface.

It is another object of the invention that any water stabilizer can be locked into position, either up or down.

Yet another object of the invention is that movement of the foils can be accomplished by an actuator where such an actuator is preferably a fluid actuator.

It is still another related object of the invention that the water stabilizer can be retracted into a gas cushion recess.

It is another related object of the invention that said hydrofoil can be changed in position during vehicle operation so that it can accomplish at least part of vehicle trim requirements.

It is yet another object of the invention that the hydrofoil can be angled to accomplish a vehicle bow up attitude, at very high speeds, to aid in getting the vehicle into an airborne mode.

It is yet another related object of the invention that the water stabilizer can further comprise a small boat shaped member.

Another object of the invention is that both water and air propulsion systems can be applied to the vehicle.

It is a directly related object of the invention that a common power source can be used, at least partially, for both the water and air propulsion systems.

It is another related object of the invention that the common power system can drive the air or water propulsion system independently.

Another feature of the invention is that sidewings can be utilized to aid in vehicle aerodynamic lift.

It is a related object of the invention that such sidewings can further comprise outrigger type hulls.

It is another related object of the invention that such sidewings can be retractable.

It is another object of the invention that such sidewings can be more than sixty percent of the beam of the parent hull. It is yet another related object of the invention that retractable winglets that may further include wingcaps to improved aerodynamic efficiencies can be used to improve aerodynamic lift.

The invention will become better understood upon reference to the drawings and the detailed description of the invention which follow in which:

DETAILED DESCRIPTION

Figure 1:
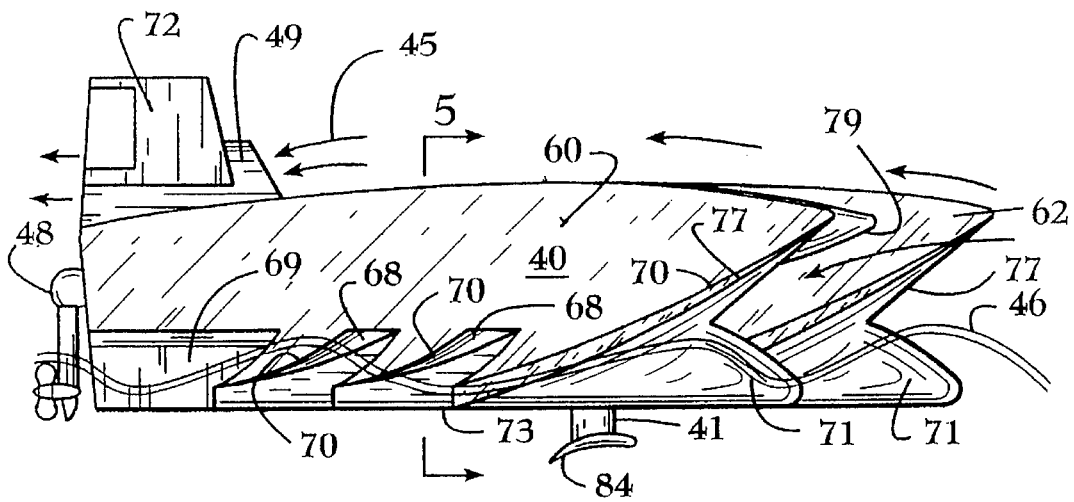
FIG. 1 is a profile view of the instant invention Sea-Coaster as seen when running as a marine surface vessel in rough seas. Note the SeaSabre bows, water stabilizer which in this case is a hydrofoil, and vertically high steps, all of which greatly enhance vehicle ride qualities.

FIG. 1 presents a profile view of the inventive multihull marine vehicle 40 showing a starboard sidehull 60 and a third hull 62, in this case on main hull centerline, in this FIG. 1 triple hull arrangement. In this instance, the vehicle 40 is riding steady in a heavy sea as indicated by waterline 46. This smooth ride is made possible by the SeaSaber bows 71 that slice and part waves and by the water stabilizer 41 which in this case includes a hydrofoil 84. Resistance is kept to a minimum by the vertically deep sidesteps 68 and their following straight side inset 69. As waves pass down the vehicle sides, they see less hull to wet due to the sidesteps that normally extend from proximal the sidekeels 73 to about the same height as the depth of the gas cushion recess inside. It is important to note that sidesteps 68 taper back down such that their chines 70 wind up at a similar elevation as a chine 70 forward of said sidestep 68. Also shown in FIG. 1 are a water propulsor 48, air propulsor 49, aerodynamic stabilizer 72, chine 70, main bow stem 77, wetdeck 79, wetdeck aft seal 81, sidekeel 73 which is also the boundary of the air cushion recess, air flow arrows 45, starboard sidehull 60, and third hull 62.

Figure 2:
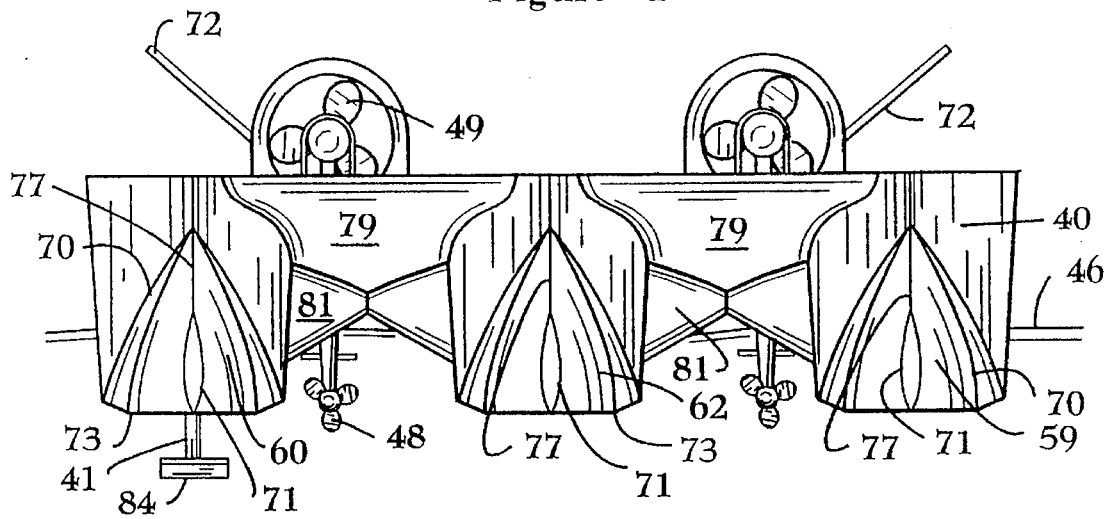
FIG. 2 is a bow view of the SeaCoaster presented in FIG. 1 showing the SeaSabre bows, air and water drives, and inverted-V shape between the three hulls shown in this configuration. Note that multiple hulls are meant to mean two or more hulls for purposes of this application. Preferred configurations utilize two sidehulls only or two sidehulls and a third hull on centerline; however, more than three hulls are quite feasible in situations requiring very wide hull layouts.

FIG. 2 is a bow view of the marine vehicle 40 showing sidehulls 59, 60 and third hull 62 which in this case is on main hull centerline, and their SeaSaber bows 71. Note that the SeaSaber bows are essentially knife or saber shaped, as seen in this bow view, to enable a clean wave slicing effect. Note that the main bow stem 77 intersects with the SeaSaber bow 71 proximal a waterline 46 in the preferred embodiment. Wetdecks 79 are also shown.

Figure 3:
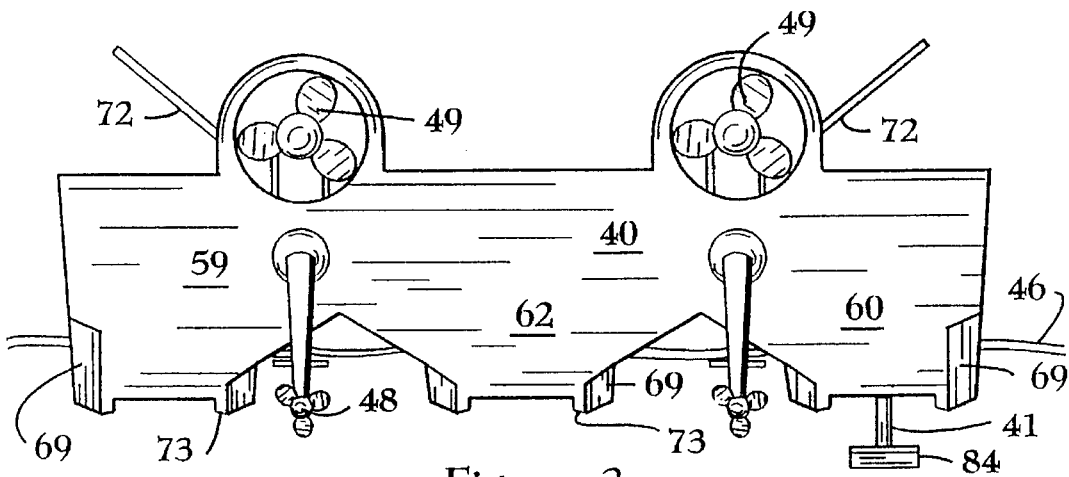
FIG. 3 is a stern view of the SeaCoaster of FIG's 1 and 2.

FIG. 3 is a stern view of the marine vehicle 40 which shows the preferred inverted-V shaped seals 81 between the multiple hulls 59, 60, 62. This inverted-V shape serves three purposes: first it directs clean water to the water propulsor 48, second it provides a low impact design in heavy seas, and third it forms an air dam for escaping ram air thereby insuring maximum pressure for lift in the wetdeck areas between the hulls.

Figure 4:
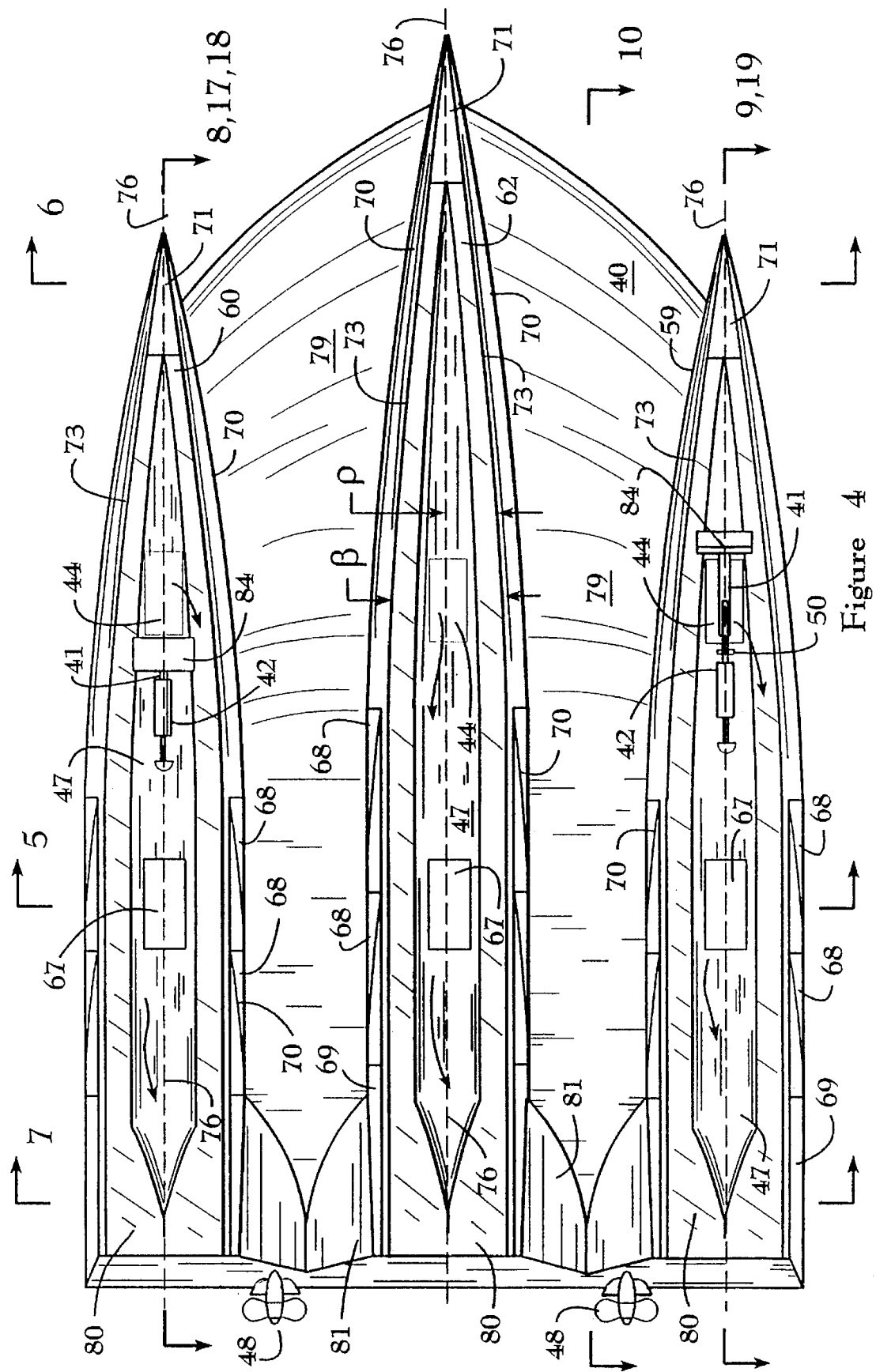
FIG. 4 is a bottom plan view of the inventive SeaCoaster of FIG's 1, 2, and 3. Note particularly the small angle of divergence (β) of the pressurized gas cushions. In the optimum or preferred embodiment, the divergence of air cushion recess sidekeels is symmetrical, or nearly so, about a centerline of one of the individual multiple hulls. The port water stabilizer, in this case a hydrofoil, is shown retracted and the starboard water stabilizer is shown as extended in this FIG. 4 for illustration purposes only.

FIG. 4 presents a bottom plan view of the triple hulled SeaCoaster marine vehicle 40 of FIG's 1–3. Very importantly, note the extremely fine entries on the SeaSaber bows 71 and the shallow average total divergence angles (β) of the water contacting sidekeels that occur from the point of the divergence forward to a point where the sidekeels 73, which are also the sealing edge of the gas cushion recesses 47, become essentially parallel. Note that by definition here it is considered that this sidekeel divergence is measured in a calm sea surface waterline when an air cushion is pressurized and supporting craft weight and the marine vehicle is traveling forward at high speed. High speed is defined as over water speeds of greater than fifteen knots for purposes of this application. It is also considered that the multiple hulls, as seen in the same calm sea surface as previously defined, will be seen as essentially boat shapes with narrow bows that then diverge, by way of the sidekeels, to more parallel sections.

The point where the sidehull keels 73 become essentially parallel is noted to normally be at about one third to one half the waterline length of the vehicle 40. It is to be noted that partial angles of divergence (ρ) are shown in FIG. 4 where they are essentially equal on either side of a longitudinal vertical plane 76 in this symmetrical hull depiction. However, it is not necessary that the partial angles of divergence (ρ) be equal and it is quite possible that all of the total average divergence angle (β) can occur to one side of a longitudinal vertical plane 76. Extensive tests of Applicant's narrow bow air cushion boat designs, both model and full scale, have defined optimum total divergence angles (β).

By way of discussion, a rectangular gas cushion with a squared off front end and substantially parallel widely separated sidekeels will actually be the most efficient in calm seas as it has the largest cushion area and hence the lowest most efficient gas cushion pressure, the bow seal will actually be clear of the water at high speed resulting in minimum bow seal drag, and the sidekeels will be substantially parallel over their entire length which is a least drag situation. However, such squared off bow seal designs have very poor rough sea performance. Tests have been conducted on Applicant's designs with reduced sidekeel total divergence angles (β). These tests have shown that bow movement or pitching starts to fall into an acceptable range at a total divergence angle (β) of slightly less than 22 degrees. Keep in mind that reducing the total divergence angle (β) also reduces the available cushion area which means that a higher less efficient gas cushion pressure is required. In summary, tests of Applicant's designs have established that the optimum total divergence angle (β) for good rough water performance coupled with acceptable air cushion areas is less than 22 degrees with less than 18 degrees and down to 15 degrees appearing near optimum. The 18 and 22 degree limitation definitions of total divergence angle (β) are strong and necessary requirements of the instant invention that are not taught by any of the prior art. The divergence angle (β) limitations were only arrived at after extensive and expensive test programs.

Also shown in FIG. 4 are blower discharge openings 44 and connecting ducts 67, sidesteps 68, recess aft seals 80, and sidewall side inset 69 behind the last sidestep. Note that the starboard water stabilizer 41 is raised into the starboard sidehull's open bottomed recess 92 and lowered on the port side in this instance which was done for illustrative purposes only. It is not considered necessary that all of the multihulls to contain pressurized gas cushions for the invention to function. For example, the third hull 62 of FIG. 4 could be of a conventional solid V-hull configuration and could also only extend for a portion of the distance back from the bow to stern if desired.

Figure 5:
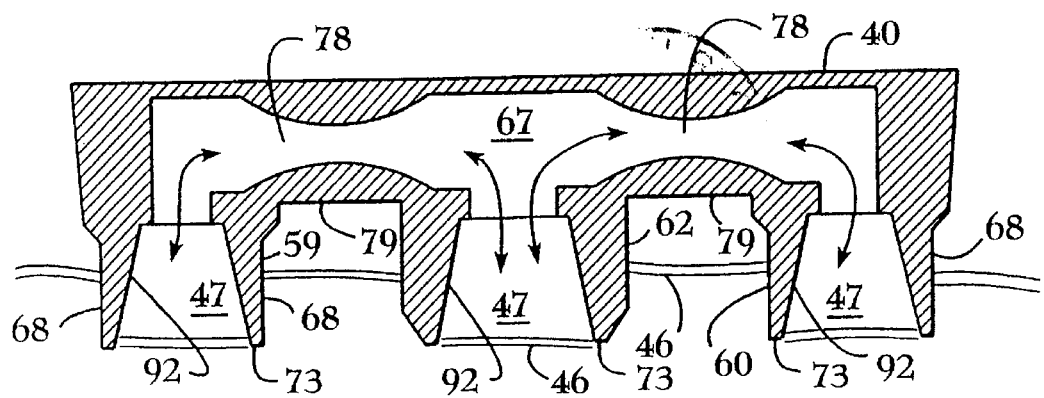
FIG. 5 is a midship cross section, as taken through line 5—5 of FIG's 1 and 4, that shows a three hulled SeaCoaster with its gas cushions pressurized and with an interconnecting gas duct where the interconnecting gas duct preferably includes a venturi positioned as part of the duct to dampen pressure pulses and prevent such pressure pulses from traveling from one gas cushion to another.

FIG. 5 is a cross section, as taken through line 5—5 of FIG's 1 and 4, that shows the air cushions 47 in a pressurized condition as disposed in open bottomed recesses 92 in multiple hulls. Note that the interconnecting ducts 67 have venturis 78 built in which is done to restrict pressure pulses from traveling from one gas cushion to another.

Figure 6:
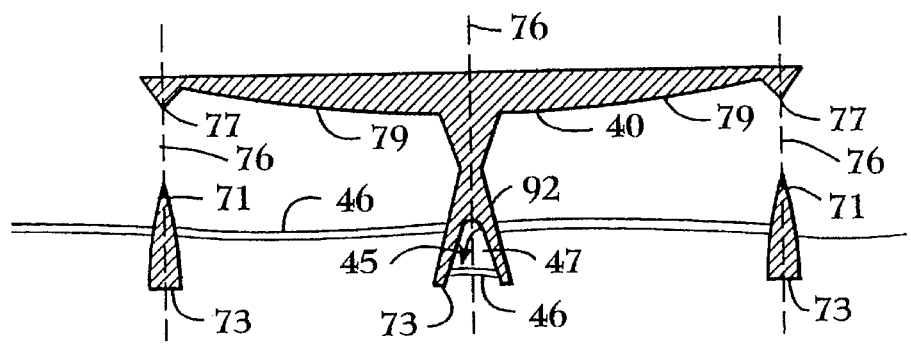
FIG. 6 is a forward cross section, as taken through line 6—6 of FIG. 4, that shows the SeaSaber bows. Note that the outboard SeaSaber bows, positioned on port and starboard sidehulls, are basically flat on their bottom surfaces at this developed cross section of the bows and that the center hull bow shows a start of the pressurized gas cushion. This is because the third or center bow extends further forward in the arrangement presented in FIG. 4.

FIG. 6 is a cross section, as taken in a vertical transverse plane of the vehicle defined as being through line 6—6 of FIG. 4, that clearly shows the optional SeaSaber bows 71 at this position having very sharp wave slicing upper portions that go to flatter portions on their lower sides where the gas recesses 47 are developing. This can best be seen upon examination of the center hull where the gas cushion recess 47 is more developed due to the more forward extension of the center hull. The bow stem 77 intersects the SeaSaber bow 71 just forward of this vertical transverse plane in this instance. FIG. 6 also shows vertical longitudinal planes 76 of the vehicle 40. Note that in this instance the center hull shown is normally referred to as the third hull and that more than three multiple hulls can be used in the SeaCoaster concept.

Figure 7:
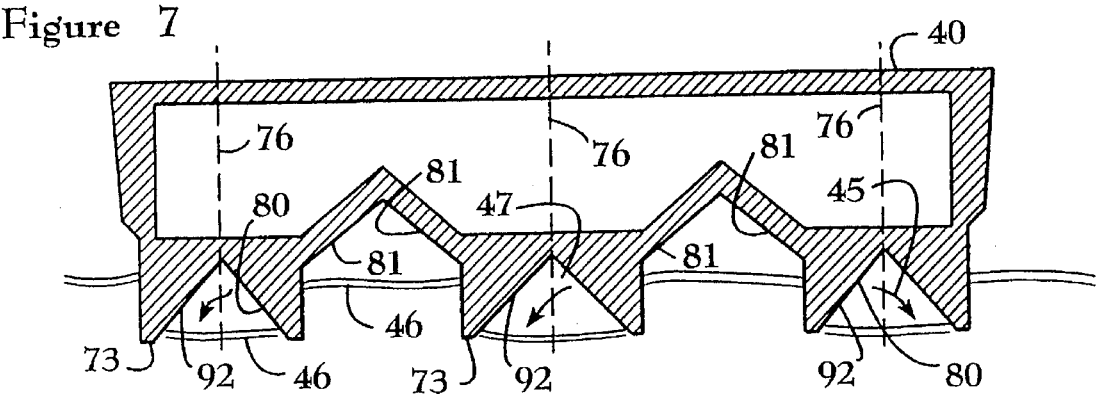
FIG. 7 is an aft cross section, as taken through line 7—7 of FIG. 4, that shows development of the preferred inverted-V stern seals in the gas cushions and between the hulls.

FIG. 7 is a cross sectional view of an aft portion of the marine vehicle 40, as taken through a vertical transverse plane noted as 7—7 of FIG. 4, that shows the preferred inverted-V shaped recess aft seals 80 and wetdeck aft seals 81.

Figure 8:
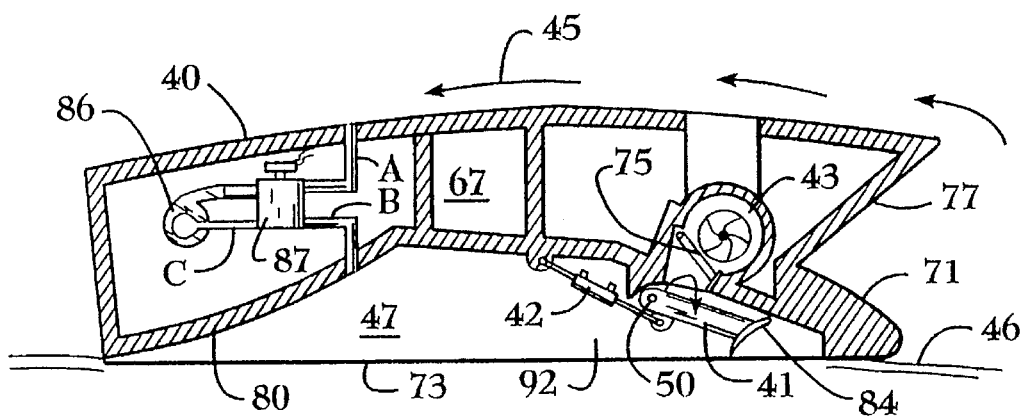
FIG. 8 is a cross sectional view, as taken through line 8—8 of FIG. 4, that shows a gas recess, blower, and gas sealing member shown as a flap on the blower discharge in this instance. The gas sealing member is closed in this instance since the main cushion blower is inoperative. The auxiliary gas pump positioned aft here is used when the gas sealing member is secured. By selection of porting on the valve shown, the gas pump can either maintain an air cushion by supplying pressurized gas to the recess and thereby maintain vehicle elevation or evacuate gas from the recess and thereby lower the vehicle. The latter case, lowering of the vehicle is valuable in certain docking situations or, particularly, in the case of patrol craft who want to minimize their radar signature when on station. A water stabilizer is also shown in retracted position in this instance for calm sea or shallow water operation.

FIG. 8 is a cross sectional view, as taken though a vertical longitudinal plane noted as line 8—8 of FIG. 4, that shows a powered blower 43, water stabilizer 41 in a retracted position, hydrofoil 84, water stabilizer actuator 42, and gas sealing mechanism 75, normally a flap-like device, that can be resiliently biased or powered for movement, that acts to prevent cushion gas pressure from escaping through an inoperative blower 43. The gas sealing mechanism can also act to prevent gas from entering the open bottomed recess 92.

The ability to seal the open bottomed recess 92 is several fold. First, it allows gas to enter the recess through duct 67 in the event of a blower failure. Second, it allows a gas pressurizing device 86 to maintain a SeaCoaster on cushion for extended periods at dockside, etc. with the main blower(s) 43 off and their ducts sealed. Third, it allows a SeaCoaster to be sucked down onto the water by having the gas pressurizing device 86 exhaust gas from the recess 92. The latter item is valuable for patrol craft where a minimum radar signature is desired when standing on station and for certain docking situations. The operation of the pressurizing device 86 is controlled by valve 86. To pressurize, A is open to C and D is open to B. To exhaust, B is open to C and D is open to A. It is to be noted that a relatively good seal is required by the gas sealing mechanism 75 for the pressurizing device 86 to be able to pressurize and exhaust properly. As such, a value of a 90 percent or better seal against gas leakage is prescribed for this seal.

Figure 9:
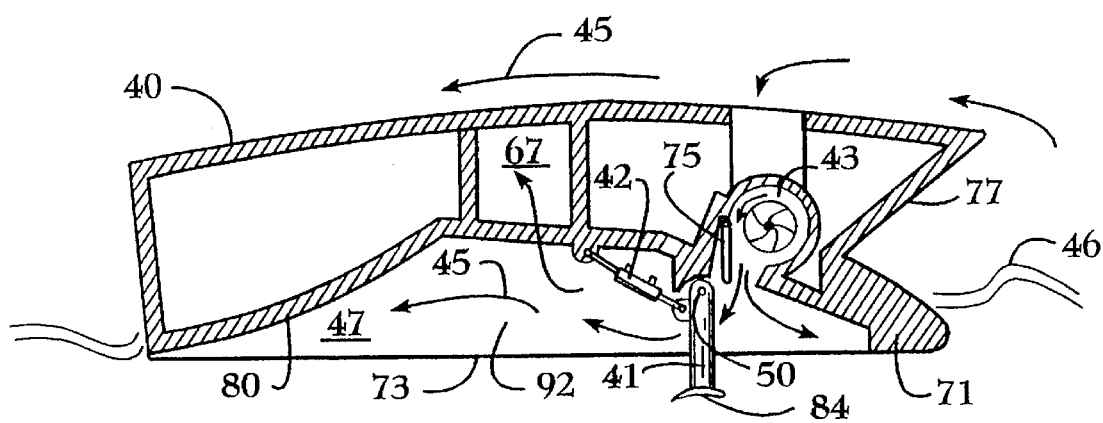
FIG. 9 is a cross sectional view, as taken through line 9—9 of FIG. 4, that is similar to FIG. 8 only with the water stabilizer extended for rough sea operation and the blower operating with its discharge flap open to allow pressurized gas to discharge from the blower.

FIG. 9 is a similar cross sectional view to that presented in FIG. 8, as taken through line 9—9 of FIG. 4, that shows the blower 43 operating and gas sealing mechanism 75 therefore open. Also, in this instance, the water stabilizer 41 is down and acting as a hydrofoil.

Figure 10:
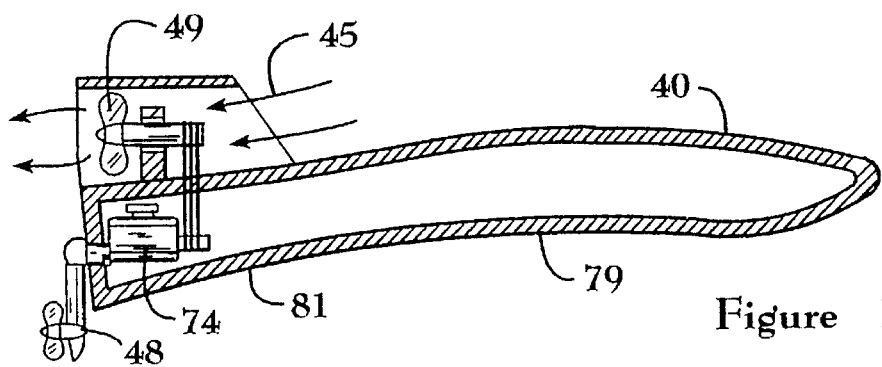
FIG. 10 is a cross section, as taken through line 10—10 of FIG. 4, that shows connecting hull structure. This also shows an air and a water propulsor that are, in this instance, driven by a common prime mover. The common prime mover would generally be considered to include disconnecting clutches to allow driving of either air and water propulsors separately.

FIG. 10 is a cross-sectional view, as taken through line 10—10 of FIG. 4, that shows water propulsor 48, air propulsor 49, and their common prime mover engine 74. Note that it is possible for the common prime mover engine to drive either the water and air propulsors at the same time for independently. This would normally be accomplished by means of disengaging clutches that are considered part of the common prime mover engine package. In the preferred embodiment the water propulsor is disengaged when the vehicle is airborne. Note that the wetdeck 79 is shaped like the underside of a low speed aircraft wing to obtain maximum aerodynamic lift.

Figure 11:
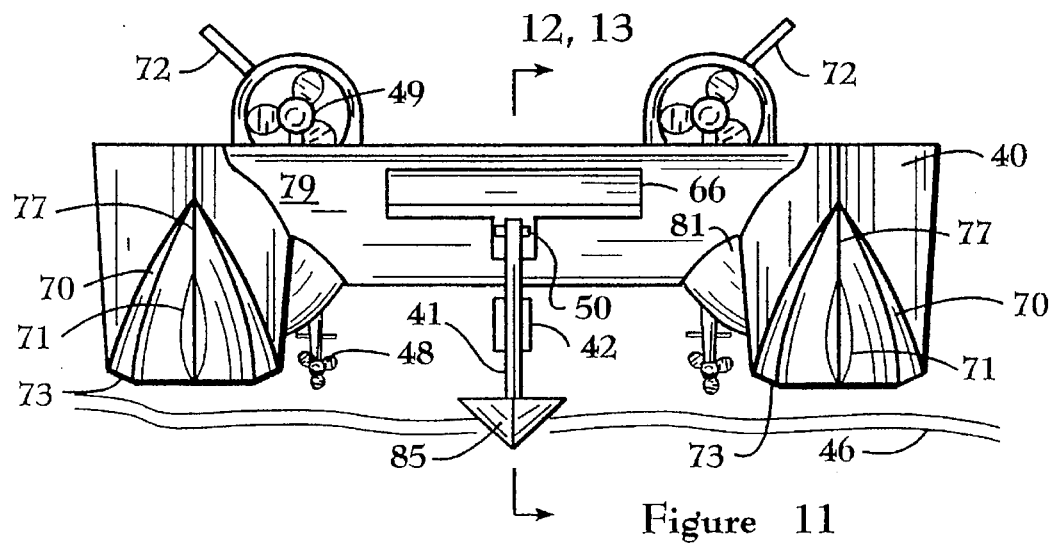
FIG. 11 is a bow view of a SeaCoaster with two hulls rather than the three that were presented in FIG's 1 and 4. Further, a retractable water stabilizer, in this case shaped like a small boat hull, is disposed between the hulls as an option.

FIG. 11 presents a bow on view of the same type of marine vehicle 40 as presented in FIG's 1–10 but with only two multi-hulls that are therefore in a catamaran configuration. Note that for purposes of this application the term multiple hulls is defined to mean two or more hulls. FIG. 10 shows a variation of a retractable water stabilizer 41 which in this case is positioned between the sidehulls as a landing hull member 85.

Figure 12:
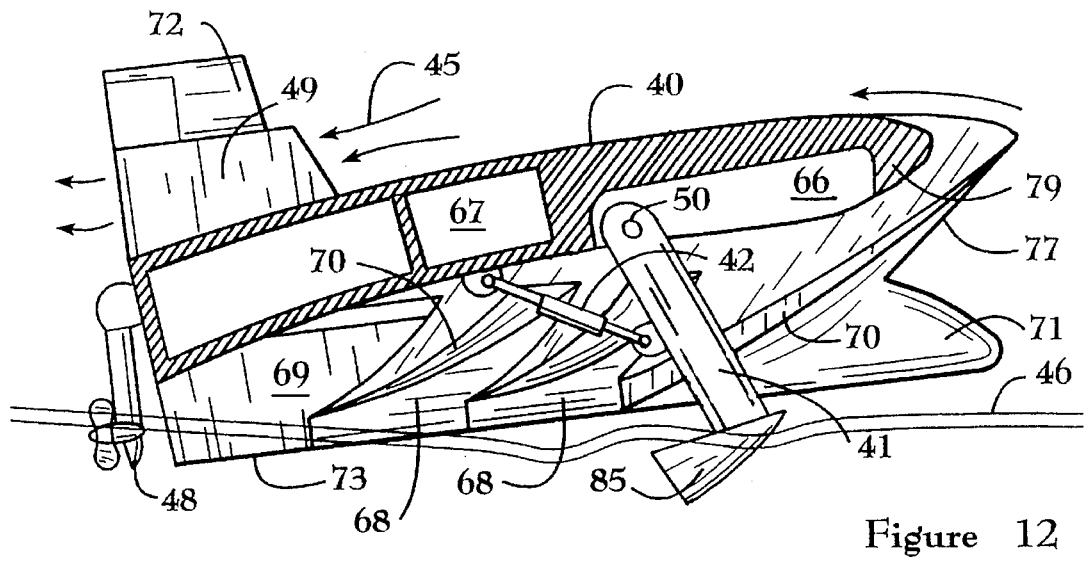
FIG. 12 is a cross sectional view, as taken through line 12—12 of FIG. 11, that illustrates a very high speed takeoff mode for a SeaCoaster where the water stabilizer is at a high angle of attack for the critical landing situation from an airborne operational mode. The proper landing attitude has the gas recess stern seals contact first and then the forward water stabilizer(s). Note that water stabilizers can also be positioned in the port and starboard sidehulls. The same water stabilizer position and vehicle attitude can optionally be used during takeoff.

FIG. 12 is a cross sectional view, as taken through line 12—12 of FIG. 11 that shows the water stabilizer 41 at a high angle of attack to therefore aid in takeoff or landing of the vehicle 40 from waterborne to a flying or airborne mode at very high speeds. For purposes of definition, waterborne speed is meant to mean speeds of up to about 120 knots and airborne speeds meant to mean speeds anywhere from about 80 knots or more in this application. By way of further definition, high waterborne speeds are hereby noted to be waterborne speeds of 15 knots or more. Takeoff speeds are generally above about 80 knots. Also, note that the angle of attack of the vehicle 40 shown in FIG. 12, with the water stabilizer(s) 41 angled as shown, is the preferred landing configuration and that the preferred approach to landing A SeaCoaster is to set the recess aft seals down first and then rotate so that the water stabilizer 85 forward contacts the water. The blower engines would be actuated before making a landing approach to insure availability of cushion pressure.

Figure 13:
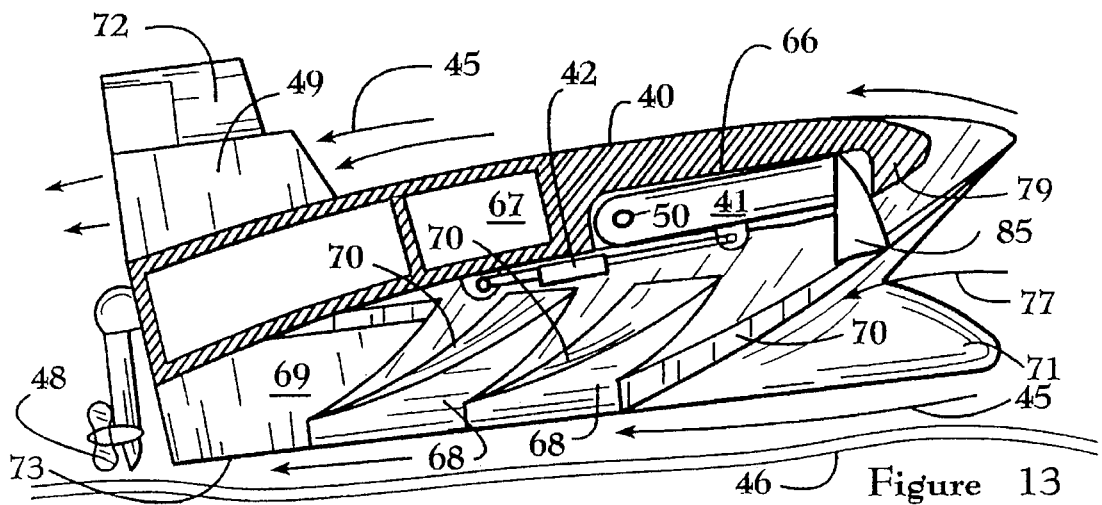
FIG. 13 is the same general cross sectional view, as taken through line 13—13 of FIG. 11, that shows the SeaCoaster in a ground effect flight or airborne mode with the water stabilizer retracted and all propulsion from the air propulsor.

FIG. 13 is a cross sectional view, as taken through line 13—13 of FIG. 12, that shows the marine vehicle 40 in its wing in surface effect airborne flight mode. Note that the air propulsor 49 is the means of generating thrust in both FIGS. 12 and 13.

Figure 14:
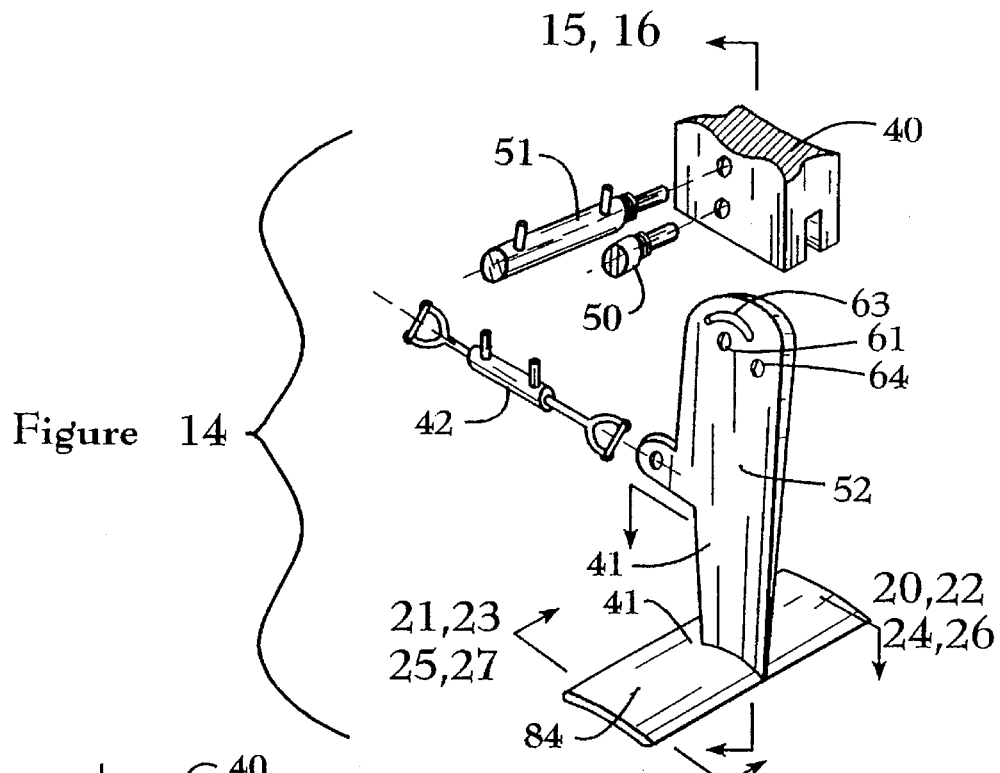
FIG. 14 presents an isometric view that shows details of a simple water stabilizer in the form of an inverted-T foil system as is preferred for SeaCoaster.

FIG. 14 presents an isometric view of the preferred configuration of a water stabilizer assembly 41 which in this case is in the form of a simple inverted-T with the strut 52 making up the stem of the T and the hydrofoil 84 the top, or bottom in this illustration, of the T. Also shown are a pivot pin 50, locking actuator 51, locking hole 64, and locking slot 63.

Figure 15:
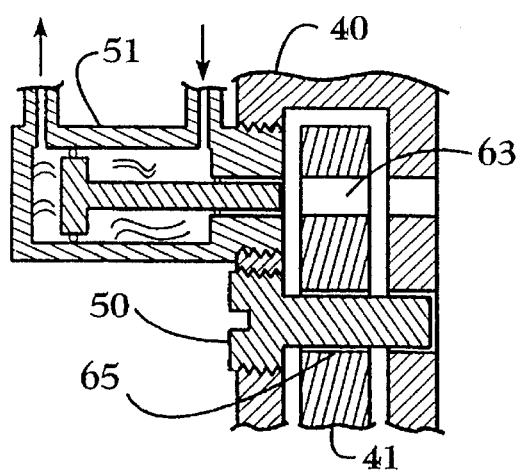
FIG. 15 is a partial cross sectional view, as taken though line 15—15 of FIG. 14, that shows working of an water stabilizer lock and hinge when unlocked.

FIG. 15 is a partial cross sectional view, as taken through line 15—15 of FIG. 14, that shows the water stabilizer assembly 41 free to move as the locking actuator 51 is not actuated.

Figure 16:
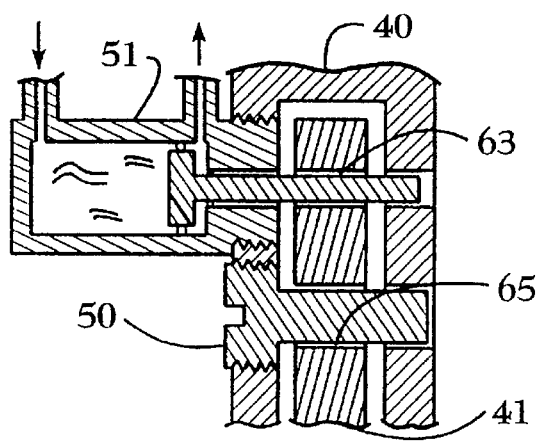
FIG. 16 is a partial cross sectional view, as taken through line 16—16 of FIG. 14, that shows the water stabilizer locked in position.

FIG. 16 is the same partial cross sectional view as presented in FIG. 15, and as taken through the line 16—16 of FIG. 14, that shows the locking actuator 51 engaged to thereby lock the water stabilizer assembly 41 in place.

Figure 17:
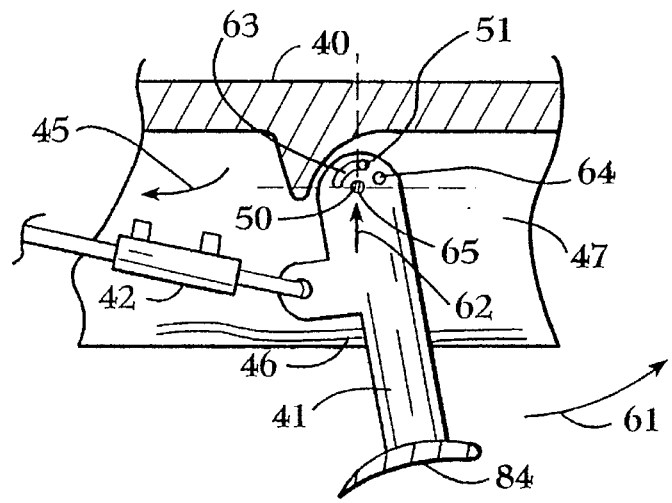
FIG. 17 is a partial cross sectional view, as taken through line 17—17 of FIG. 4, that illustrates operation of a foil when tilted backward to institute a generation of forces to pitch the bow down.

FIG. 17 is a partial cross sectional view, taken through line 17—17 of FIG. 4, of a water stabilizer assembly 41 in a lowered position but at an angle of attack to cause a raising of the bow. Note that in this case the locking actuator 51 is engaged in locking slot 63 so that there is limited movement of the hydrofoil 84 as indicated by rotation arrow 61. Note that a retractable hull member as shown as 85 in FIG's 11, 12 and 13 could be used instead of a hydrofoil if desired.

Figure 18:
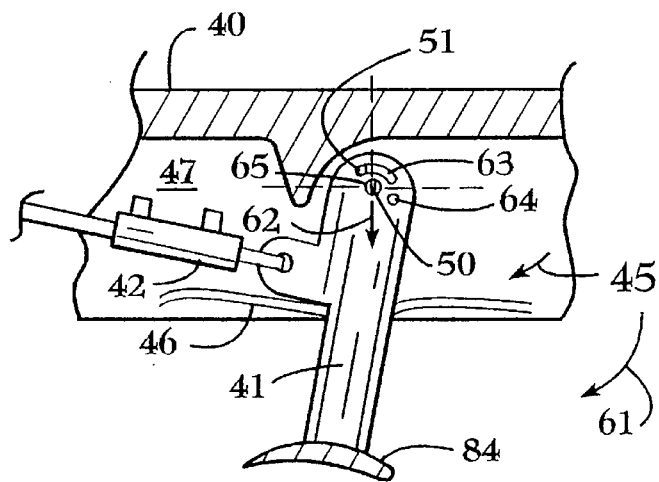
FIG. 18 presents the same partial cross sectional view, as taken through line 18—18 of FIG. 4, as that presented in FIG. 17 but with a foil trimmed to create a pitch up of the bow.

FIG. 18 is a similar partial cross sectional view, taken through line 18—18 of FIG. 4, as presented in FIG. 17 but with the water stabilizer assembly 41 having its hydrofoil 84 at a negative angle of attack to thereby create a downward moment about the bow.

Figure 19:
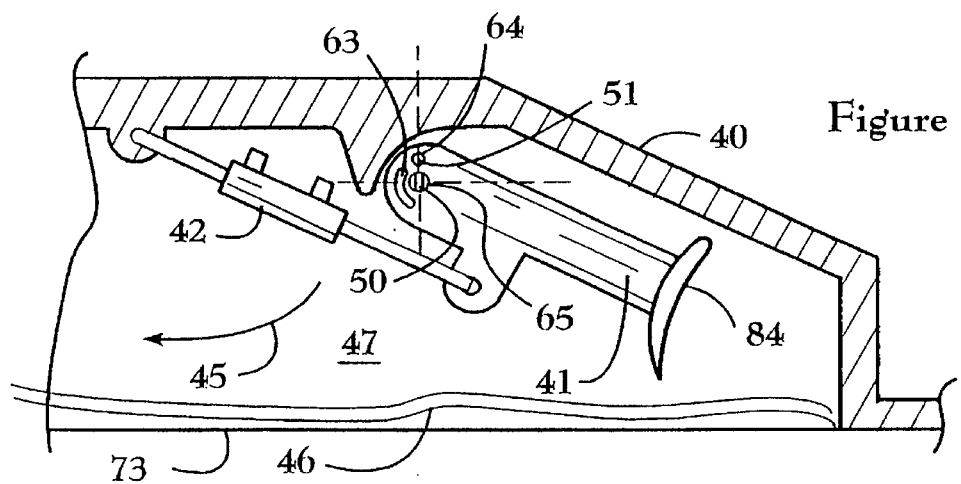
FIG. 19 is a partial cross sectional view, as taken through line 19—19 of FIG. 4, that shows details of a water stabilizer when retracted.

FIG. 19 is another partial cross sectional view, taken through line 19—19 of FIG. 4 of a water stabilizer assembly 41 as retracted back up into a gas cushion recess 47 as is the case of the port sidehull in FIG. 4. Note that the locking actuator 51 is engaged into the locking hole 64 here to insure positive fixing of the water stabilizer assembly 41.

Figure 20:
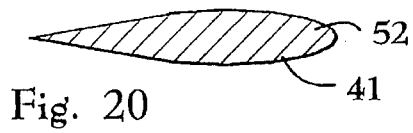
FIG. 20 is a cross section of a water stabilizer strut of airfoil shape.

FIG. 20 is a cross section, as taken through line 20—20 of FIG. 14, that shows an airfoil shaped strut 52.

Figure 21:
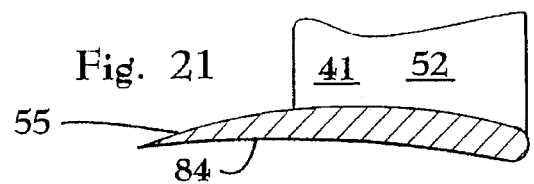
FIG. 21 is a cross section of a foil of airfoil shape.

FIG. 21 is a cross section, as taken through line 21—21 of FIG. 14 that shows a cambered airfoil shaped hydrofoil 55.

Figure 22:
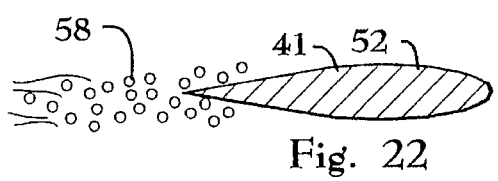
FIG. 22 is a cross section of a water stabilizer strut showing formation of water vapor related to very high vehicle speeds.

FIG. 22 is the same as presented in FIG. 22 but showing the onset of formation of water vapor, most commonly known as cavitation, about the aft end of the strut 52. This would occur at about 45 knots for most waterborne hydrofoil craft.

Figure 23:
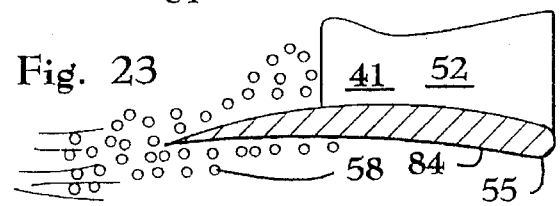
FIG. 23 is a cross section of a foil showing formation of water vapor related to cavitation which can cause foil damage.

FIG. 23 is the same as FIG. 21 but, again, showing the onset of cavitation. In this case it is about the hydrofoil 55 and strut 52.

Figure 24:
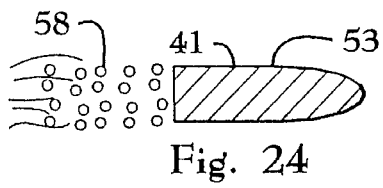
FIG. 24 shows an approach to avoiding cavitation damage to a water stabilizer strut by chopping said strut off.

FIG. 24 is a cross sectional view, as taken through line 24—24 of FIG. 14, that shows a chopped strut 53 that is base vented from surface air to avoid cavitation damage to the strut.

Figure 25:
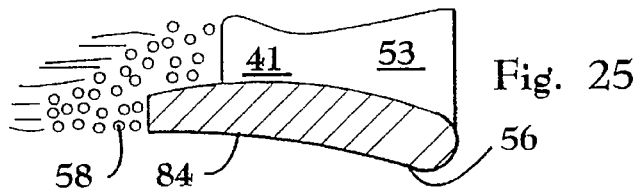
FIG. 25 shows a similar chop off approach as applied to a foil.

FIG. 25 presents a partial cross sectional view, as taken through line 25—25 of FIG. 14, that shows a chopped hydrofoil 56 and chopped strut 53 and cavitation or vapor 58 bubbles.

Figure 26:
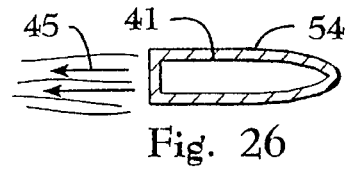
FIG. 26 shows a preferred strut concept that uses a chopped off strut that is base vented with gas.

FIG. 26 is a cross sectional view, as taken through line 26—26 of FIG. 14 that shows a chopped hollow strut 54 that is base vented with gas.

Figure 27:
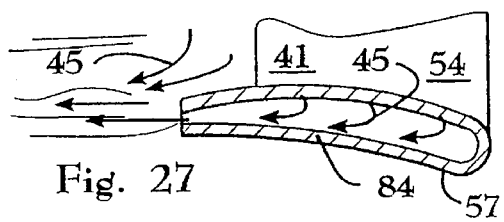
FIG. 27 presents a preferred embodiment foil that is base vented to avoid cavitation and its damaging effects to the foil.

FIG. 27 presents a partial cross sectional view, as taken through line 27—27 of FIG. 14, that shows a preferred base vented hydrofoil 57 that is fed gas through a hollow strut 54. The base venting concept is found to be best for the very high speeds, actually any speeds of over about 45 knots, and is especially well suited for speeds approaching the takeoff speeds of SeaCoaster.

Figure 28:
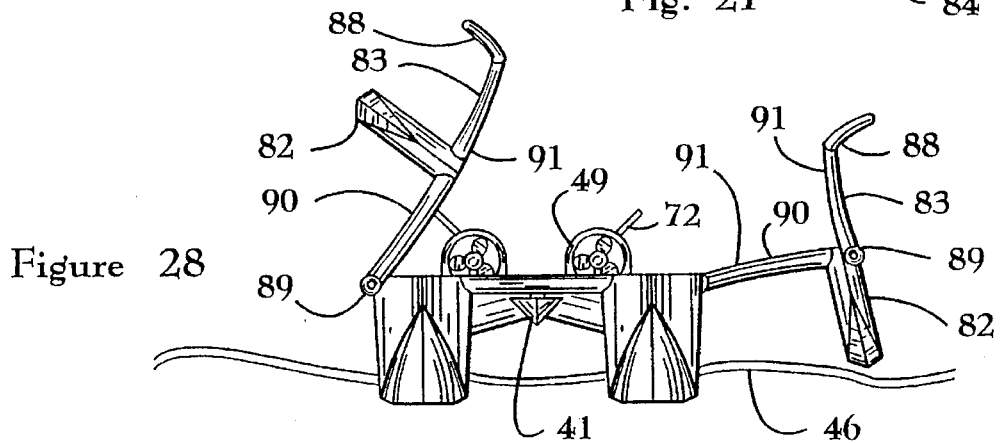
FIG. 28 is a bow view of a waterborne dual-hulled SeaCoaster that is equipped with outrigger hulls that are connected to the sidehulls by outrigger wings. Also shown are winglets positioned outboard of the outrigger hulls. This FIG. 28 illustrated different methods of retracting either an entire wing and outrigger hull, shown on its starboard side, or just a winglet, shown on its port side. Said winglets includes downwardly extending wingcaps here to insure maximum aerodynamic efficiency.

FIG. 28 is a bow view of the instant invention with optional outrigger hulls 82, outrigger wings 90, winglets 83, and wing caps 88. These enhancements allow extra lift for SeaCoaster when in the airborne mode and also add stability, by means of the outrigger hulls 82, when waterborne. FIG. 28 shows optional means of reducing beam. This is made possible by a complete folding up of the sidewing 91 as illustrated on its starboard side while the port side shows a folding of the winglet 83 only. Either approach is feasible while the partial folding as shown on the starboard side is preferred due to its simplicity and the fact that it keeps its outrigger hull 82 waterborne at all times for maximum transverse or roll stability.

Figure 29:
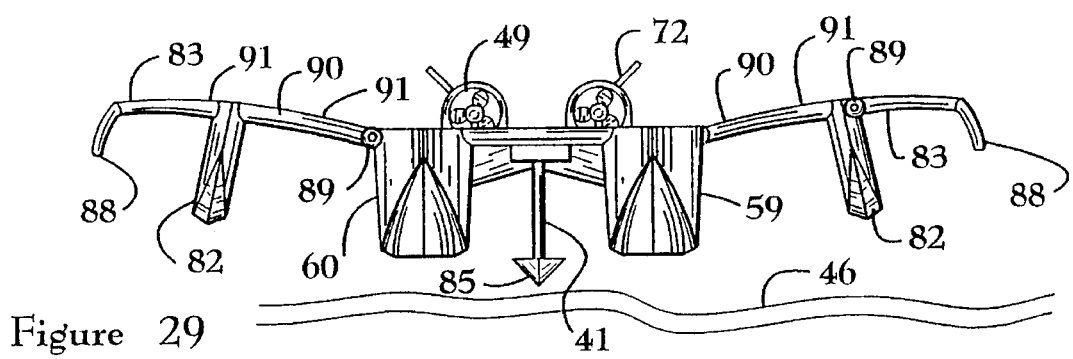
FIG. 29 is a bow view of the same SeaCoaster as presented in FIG. 28 but in an airborne mode with its sidewings locked in position.

FIG. 29 presents the same bow view as FIG. 28 but with the inventive SeaCoaster airborne and with its hinges 89 locked. Also shown is a landing hull 85 in position for landing.

Figure 30:
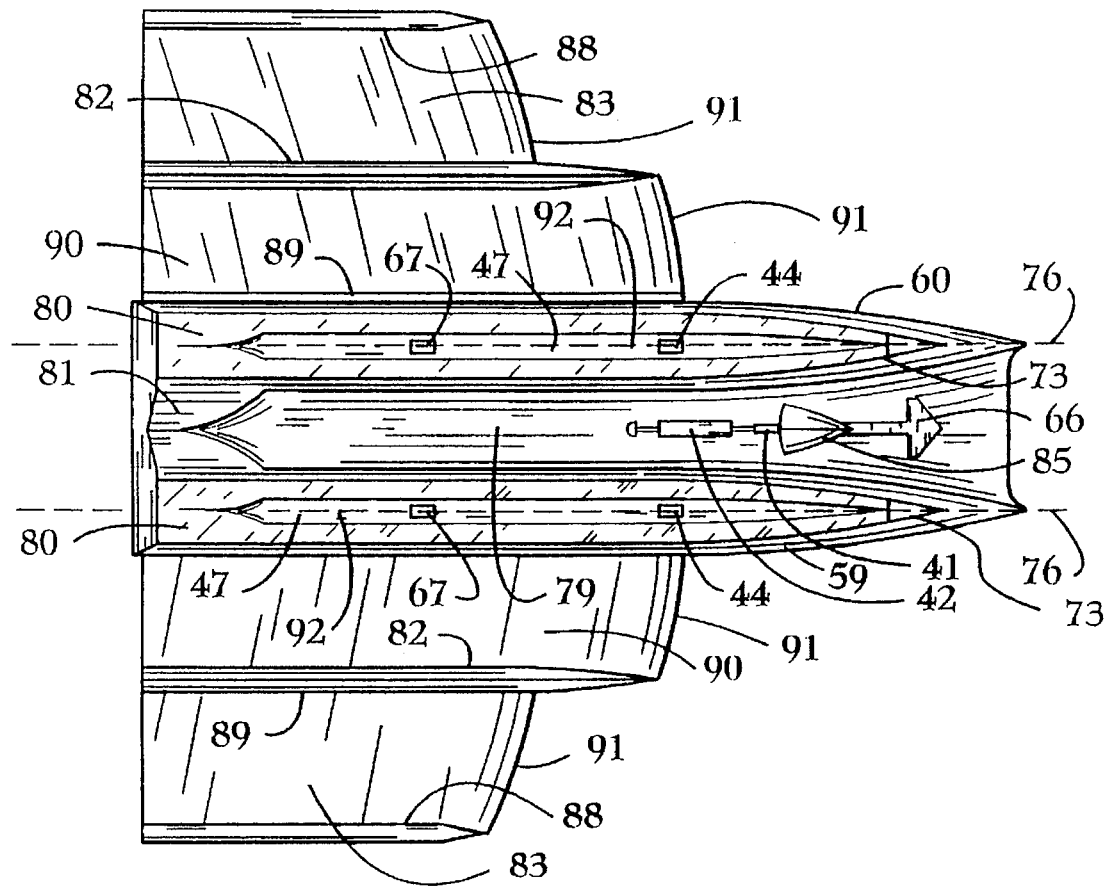
FIG. 30 is a bottom plan view of the SeaCoaster of FIG. 29.

FIG. 30 is a bottom plan view of the inventive SeaCoaster shown in FIG. 29.

While the invention has been described in connection with a preferred and several alternative embodiments, it will be understood that there is no intention to thereby limit the invention. On the contrary, there is intended to be covered all alternatives, modifications and equivalents as may be included within the spirit and scope of the invention as defined by the appended claims, which are the sole definition of the invention.

What I claim is:

1. In an improved marine vehicle including a propulsion system and with multiple hulls where said multiple hulls are in mechanical communication, the improvement comprising:

port and starboard sidehulls with each sidehull comprising an open bottomed recess that is artificially pressurized with gas from at least one gas pressurization means to thereby form a weight supporting gas cushion when said marine vehicle is waterborne with boundaries of said recess at least partially defined by water contacting substantially rigid sidekeels and a recess aft seal and where, as seen in a calm sea surface water-line with the gas cushions pressurized and the marine vehicle waterborne and moving forward at high speed, the sidehulls are separated by a water clearing wetdeck and are individually substantially boat shaped with narrow bows forward that then diverge, by way of the water contacting substantially rigid sidekeels, and with said sidekeels transforming to more parallel sections over their aft portions and wherein an average total divergence angle of the water contacting sidekeels of said sidehull recess, as measured from the narrow bow to where the sidekeels become more parallel over their aft portions, is on average less than twenty-two degrees and where each of said sidekeels diverges on average over a minimum of one third of its water contacting length going aft from the narrow bow forward to where the sidekeels become more parallel over their aft portions.

2. The improved marine vehicle of claim 1 wherein an average total divergence angle of water contacting gas cushion restraining sidekeels of said sidehull recesses is less than eighteen degrees.

3. The improved marine vehicle of claim 1 which further comprises an artifically pressurized gas cushion that supports part of the weight of the marine vehicle, when said marine vehicle is waterborne, disposed at least partially in an open bottomed recess in a multiple hull with said multiple hull positioned, at least in part, between the port and starboard sidehulls as a third hull and where said third hull's open bottomed recess is at least in part defined by substantially rigid water contacting sidekeels and a recess aft seal and where said third hull, as seen in a calm sea surface waterline when the marine vehicle is waterborne and traveling forward at high speed, is individually boat shaped with a narrow bow forward that then diverges, by way of the substantially rigid water contacting sidekeels, over at least a third of a water contacting length of each of the sidekeels going from the narrow bow forward to where the sidekeels develop more parallel sections over their aft portions.

4. The improved marine vehicle of claim 3 wherein an average total divergence angle of water contacting gas cushion restraining sidekeels of said third hull's open bottomed recess is less than twenty-two degrees.

5. The improved marine vehicle of claim 1 which further comprises a port sidehull and a starboard sidehull retractable water stabilizer assembly where said water stabilizer assemblies are at least partially positioned in the respective port and starboard sidehull gas cushion restraining open bottom recesses and when said water stabilizers are extended to their lowered positions they extend substantially below the sidekeels.

6. The improved marine vehicle of claim 5 wherein the retractable water stabilizer assemblies are, at least in part, of an inverted-T shape with a single vertically oriented strut and with a lower portion of the Inverted-T shape comprising, at least in part, a hydrofoil.

7. The improved marine vehicle of claim 5 wherein said retractable water stabilizer assemblies are, at least in part, configured like a small boat hull.

8. The improved marine vehicle of claim 1 wherein a sidehull's bow disposed proximal a waterline has a forward section of bow that extends forwardly of a lower forward portion of one of the multiple hulls and wherein such forward section of bow further comprises a portion of a sidehull's gas cushion recess.

9. The improved marine vehicle of claim 1 which further comprises multiple vertically oriented water deflecting sidesteps in side surfaces of at least one of the multiple hulls and with at least one of said sidesteps extending upward from proximal a lower portion of a sidekeel to proximal a height of an upper surface of a gas cushion recess.

10. The improved marine vehicle of claim 1 wherein the recess aft seals are, as seen in a vertical transverse plane of the marine vehicle with the marine vehicle being right side up, at least in part of an inverted-V shape.

11. The improved marine vehicle of claim 1 wherein the recess aft seals are, as seen in a vertical transverse plane of the marine vehicle, at least in part of an inverted-V shape.

12. The improved marine vehicle of claim 1 which further comprises an air flow restricting seal on an underside of a wetdeck, where said wetdeck is in communication with a sidehull and connects said sidehull to another hull member, with said air flow restricting seal proximal an aft portion of said wetdeck and whereby said wetdeck is in mechanical communication with the port and starboard sidehulls.

13. The improved marine vehicle of claim 1 which further comprises a venturi positioned as part of a duct that interconnects port and starboard sidehull open bottomed recesses whereby when separate gas pressurization means are employed to pressurize the port and the starboard sidehull open bottomed recesses the venturi dampens pressure pulses between said separate port and starboard recesses and the gas pressuization means.

14. The improved marine vehicle of claim 1 which further comprises a gas flow restricting means that is independent of a water level in a gas cushion recess to restrict gas flow leakage out through one of the gas pressurization means in such instance where the gas pressurization means is inoperative.

15. The improved marine vehicle of claim 14 wherein the gas flow restricting means is a flap-like device disposed downstream of the gas pressurization means.

16. The improved marine vehicle of claim 14 wherein a gas pump can evacuate gas from the gas cushion when the gas flow restricting means is positioned to restrict gas flow.

17. The improved marine vehicle of claim 1 which further comprises a water stabilizer positioned, at least in part, proximal to and between a forward portion of the port and starboard sidehulls.

18. The improved marine vehicle of claim 17 wherein the water stabilizer is, at least in part, boat shaped.

19. The improved marine vehicle of claim 17 wherein the water stabilizer is, at least in part, a hydrofoil.

20. The improved marine vehicle of claim 17 wherein the water stabilizer is at least partially retractable into a recess in a wetdeck.

21. The improved marine vehicle of claim 1 which further comprises a sidewing with said sidewing being, on average, more than fifty percent of an overall length of the marine vehicle.

22. The improved marine vehicle of claim 21 wherein at least a portion of said sidewings are retractable.

23. The improved marine vehicle of claim 1 which further comprises outrigger wings extending outward beyond the sidehulls with said outrigger wings further comprising downwardly extending outrigger hulls.

24. In an improved marine vehicle including a propulsion system and with multiple hulls where said multiple hulls are in mechanical communication, the improvement comprising:

an artificially pressurized gas cushion that supports part of marine vehicle weight, when said marine vehicle is waterborne, disposed at least partially in an open bottomed recess in a multiple hull with said multiple hull positioned, at least in part, between port and starboard sidehulls as a third hull that is in mechanical communication with and separated from said port and starboard sidehulls by water clearing wetdecks and where said third hull's open bottomed recess is at least in part defined by water contacting substantially rigid sidekeels and a recess aft seal and where said third hull, as seen in a calm sea surface waterline when the marine vehicle is waterborne and traveling forward at high speed, is individually boat shaped with a narrow bow forward that diverges, by way of the substantially rigid water contacting sidekeels, over at least one third of a water contacting length of said sidekeels going from the narrow bow forward to where the sidekeels develop more parallel sections aft and wherein an average total divergence angle, from the narrow bow forward to where the sidekeels become more parallel, of said sidekeels is less than twenty-two degrees.

25. The improved marine vehicle of claim 24 wherein an average total divergence angle of water contacting gas cushion restraining sidekeels of said third hull's open bottomed recess is less than eighteen degrees.

26. The improved marine vehicle of claim 24 which further comprises vertically oriented water deflecting sidesteps in side surfaces of at least one of the multiple hulls wherein at least one of said sidesteps has a chine that extends downwardly going from forward to aft to proximal a level of a chine preceding said sidestep.

27. The improved marine vehicle of claim 24 wherein the third hull's recess aft seal is, over a majority of its width as seen in a vertical transverse plane of the marine vehicle, angled to horizontal.

28. The improved marine vehicle of claim 24 which further comprises a gas flow restricting means that is independent of a water level in a gas cushion recess to restrict gas flow leakage out through a gas pressurization means in such instance when said gas pressurization means is inoperative.

29. In an improved marine vehicle including a propulsion system and with multiple hulls where said multiple hulls are in mechanical communication, the improvement comprising:

port and starboard sidehulls with each sidehull comprising an open bottomed recess that is artificially pressurized with gas from at least one gas pressurization means to thereby form a weight supporting gas cushion with boundaries of said recess at least partially defined by water contacting substantially rigid sidekeels and a recess aft seal when said marine vehicle is waterborne and where, as seen in a calm sea surface waterline with the gas cushions pressurized and the marine vehicle is waterborne and moving forward at high speed, the sidehulls are separated by a water clearing wetdeck and are individually substantially boat shaped with narrow bows forward that then diverge, by way of the sidekeels, to more parallel sections aft and wherein an average total divergence angle of the water contacting sidekeels of said sidehull recess is less than twenty-two degrees going from the narrow bow to where the sidekeels become substantially more parallel and which further comprises vertically oriented water deflecting sidesteps in side surfaces of at least one of the multiple hulls wherein at least one of said sidesteps has a chine that extends downwardly going from forward to aft to proximal a level of a chine preceding said sidestep.

30. In an improved marine vehicle including a propulsion system and with multiple hulls where said multiple hulls are in mechanical communication, the improvement comprising:

port and starboard sidehulls with each sidehull comprising an open bottomed recess that is artificially pressurized with gas from at least one gas pressurization means to thereby form a weight supporting gas cushion, when said marine vehicle is waterborne, with boundaries of said recess at least partially defined by water contacting substantially rigid sidekeels and a recess aft seal and where, as seen in a calm sea surface water-line with the gas cushions pressurized and the marine vehicle waterborne and moving forward at high speed, the sidehulls are separated and substantially boat shaped with narrow bows that then diverge, by way of the sidekeels, to more parallel sections aft and which further comprises a port and a starboard sidewing with said port and starboard sidewings extending outward beyond their respective port and starboard sidehulls such that, when the improved marine vehicle is at least primarily airborne, said sidewings provide much of the aerodynamic lift required to support the improved marine vehicle and which further comprises at least one water stabilizer that is positioned proximal a forward portion of the improved marine vehicle and that extends downward below the sidekeels whereby said at least one water stabilizer provides stability during water landing of the improved marine vehicle.

31. The improved marine vehicle of claim 30 which further comprises a downwardly extending outrigger hull in mechanical communication with said sidewing.

32. The improved marine vehicle of claim 30 wherein at least a portion of said sidewing is retractable.

33. The improved marine vehicle of claim 30 wherein the sidewing further comprises a downwardly extending wing-cap.

34. The improved marine vehicle of claim 30 wherein said at least one water stabilizer is, at least in part, shaped like a boat hull.

35. The improved marine vehicle of claim 30 wherein a wetdeck that connects the sidehulls is, at least in part, airfoil shaped.

36. In an improved marine vehicle including a propulsion system and with multiple hulls where said multiple hulls are in mechanical communication, the improvement comprising:

port and starboard sidehulls with each sidehull comprising an open bottomed recess that is artificially pressurized with gas from at least one gas pressurization means to thereby form a weight supporting gas cushion when said marine vehicle is waterborne and with boundaries of said recess at least partially defined by substantially rigid water contacting sidekeels and a recess aft seal and where, as seen in a calm sea surface waterline with the marine vehicle waterborne and moving forward at high speed, the sidehulls are separated by a water clearing wetdeck and are each substantially boat shaped with narrow bows that then diverge by way of the substantially rigid water contacting sidekeels such that an average total divergence angle of the sidekeels of each sidehull is less than 22 degrees and wherein said sidekeels then become more parallel from at least one third of a distance aft of the narrow bow forward and which further comprises a port and a starboard sidewing with said port and starboard sidewings extending outward beyond their respective port and starboard sidehulls such that, when the improved marine vehicle is at least partially airborne, said sidewings provide much of the aerodynamic lift required to keep the improved marine vehicle at least partially airborne.

37. The improved marine vehicle of claim 36 which further comprises at least one water stabilizer positioned proximal a forward portion of the improved marine vehicle whereby said at least one stabilizers provides stability during takeoff and landing of the improved marine vehicle.

38. The improved marine vehicle of claim 37 wherein said water stabilizer is, at least in part, shaped like a boat hull.

39. The improved marine vehicle of claim 37 wherein said water stabilizer comprises, at least in part, a hydrofoil.

40. The improved marine vehicle of claim 36 which further comprises a downwardly extending outrigger hull in mechanical communication with said sidewing.

41. The improved marine vehicle of claim 36 wherein at least a portion of said sidewing is retractable.

42. The improved marine vehicle of claim 36 wherein the sidewing further comprises a downwardly extending wing-cap.

43. The improved marine vehicle of claim 36 wherein the wetdeck that connects the sidehulls is, at least in part airfoil shaped.

44. In an improved marine vehicle including a propulsion system and with multiple hulls where said multiple hulls are in mechanical communication, the improvement comprising:

port and starboard sidehulls with each sidehull comprising an open bottomed recess that is artificially pressurized with gas from at least one gas pressurization means to thereby form a weight supporting gas cushion when said marine vehicle is waterborne with boundaries of said recess at least partially defined by substantially rigid water contacting sidekeels and a recess aft seal with said recess aft seal, as seen in a vertical transverse plane of the improved marine vehicle, angled to horizontal over a majority of its width and where, as seen in a calm sea surface waterline with the gas cushions pressurized and the marine vehicle waterborne and moving forward at high speed, the sidehulls are separated by a water clearing wetdeck and are individually substantially boat shaped with narrow bows forward that then diverge, by way of the substantially rigid water contacting sidekeels, to become more parallel over their aft portions and where each of said water contacting sidekeels on average diverges over a minimum of one third of its water contacting length going from the narrow bow forward aft to where the sidekeels become more parallel over their aft portions.

45. The improved marine vehicle of claim 44 which further comprises a port and a starboard sidewing with said sidewings providing a majority of the lift required to support the marine vehicle when said marine vehicle is primarily airborne.

* * * * *